United States Patent
Sundaresan et al.

(10) Patent No.: US 10,609,534 B2
(45) Date of Patent: Mar. 31, 2020

(54) FEED SERVICE ENGINE

(71) Applicant: Ayla Networks, Inc., Santa Clara, CA (US)

(72) Inventors: Sudha Sundaresan, San Jose, CA (US); Vadym Byelov, Mountain View, CA (US); Sulagna Bal, San Jose, CA (US); Jeffrey Su, Cupertino, CA (US)

(73) Assignee: Ayla Networks, Inc., Milpitas, CA (US)

(*) Notice: Subject to any disclaimer, the term of this patent is extended or adjusted under 35 U.S.C. 154(b) by 299 days.

(21) Appl. No.: 15/244,998

(22) Filed: Aug. 23, 2016

(65) Prior Publication Data

US 2017/0063826 A1 Mar. 2, 2017

Related U.S. Application Data

(60) Provisional application No. 62/209,264, filed on Aug. 24, 2015.

(51) Int. Cl.
*G06F 16/00* (2019.01)
*H04W 4/70* (2018.01)
*H04L 12/24* (2006.01)
*H04L 29/08* (2006.01)
*G06F 16/2455* (2019.01)
*H04L 29/06* (2006.01)

(52) U.S. Cl.
CPC ........ *H04W 4/70* (2018.02); *G06F 16/24568* (2019.01); *H04L 41/5009* (2013.01); *H04L 67/26* (2013.01); *H04L 67/325* (2013.01); *H04L 41/5019* (2013.01); *H04L 41/5096* (2013.01); *H04L 63/104* (2013.01)

(58) Field of Classification Search
CPC ........ G06F 17/30516; G06F 16/24568; H04L 41/5009; H04L 67/26; H04L 67/325; H04L 41/5019; H04L 41/5096; H04L 63/104; H04W 4/70
USPC ........................................ 707/628
See application file for complete search history.

(56) References Cited

U.S. PATENT DOCUMENTS

| 9,953,095 | B1* | 4/2018 | Scott | G06F 21/6245 |
|---|---|---|---|---|
| 10,069,938 | B1* | 9/2018 | Zhang | H04L 67/02 |
| 2006/0161541 | A1* | 7/2006 | Cencini | G06F 16/9574 |
| 2010/0333137 | A1* | 12/2010 | Hamano | H04H 60/46 725/39 |

(Continued)

OTHER PUBLICATIONS

International Search Report and Written Opinion of the International Searching Authority for International application No. PCT/US2016/048329 dated Nov. 7, 2016, 12 pages.

*Primary Examiner* — Thanh-Ha Dang
(74) *Attorney, Agent, or Firm* — Lowenstein Sandler LLP

(57) ABSTRACT

A processing device executing a data feed service performs a first query of a repository of data feed entries. The processing device determines, based on the first query, that a first data feed entry comprises a schedule to provide data from a first data feed of a first data source to a first device in an upcoming first time period, wherein the first data feed entry identifies the first data source, a first data type associated with the first data source, the first time period, and the first device. The processing device sends, to the first data source, a request for first data having the first data type and then receives the first data. The processing device sends the first data to the first device in the first time period.

17 Claims, 7 Drawing Sheets

(56) References Cited

U.S. PATENT DOCUMENTS

| | | | |
|---|---|---|---|
| 2011/0179020 A1* | 7/2011 | Ozzie | G06F 16/958 |
| | | | 707/723 |
| 2012/0215602 A1 | 8/2012 | Ramer et al. | |
| 2014/0059182 A1* | 2/2014 | Miura | H04H 20/18 |
| | | | 709/219 |
| 2014/0173660 A1* | 6/2014 | Correa | H04N 21/25866 |
| | | | 725/42 |
| 2015/0348106 A1* | 12/2015 | Yao | G06Q 30/0256 |
| | | | 705/14.54 |
| 2016/0205106 A1* | 7/2016 | Yacoub | H04L 61/1511 |
| | | | 726/28 |
| 2016/0217176 A1* | 7/2016 | Haviv | G06F 3/0649 |
| 2016/0285891 A1* | 9/2016 | Byers | H04L 63/0884 |
| 2016/0306862 A1* | 10/2016 | Sitsky | G06F 16/254 |
| 2017/0011298 A1* | 1/2017 | Pal | G06N 5/04 |
| 2017/0039245 A1* | 2/2017 | Wholey, III | G06F 16/9024 |
| 2017/0093861 A1* | 3/2017 | Kesavan | H04L 41/0893 |

* cited by examiner

FEED SERVICE ENGINE

RELATED APPLICATIONS

This patent application claims the benefit under 35 U.S.C. § 119(e) of U.S. Provisional Application No. 62/209,264, filed Aug. 24, 2015, which is herein incorporated by reference.

BACKGROUND

Many modern appliances, consumer devices, and other devices include embedded systems that are configured to perform one or more dedicated functions. The growing number of embedded systems include network connectivity for role based access control capabilities, remote interface capabilities, remote control capabilities, or related capabilities. Designing such functionality into an embedded system can consume considerable resources of the device manufacturer.

Moreover, network connected embedded systems are consuming increasing amounts of power and bandwidth without the resources to intelligently manage communication. Absent data flow management, such devices create bandwidth bottlenecks, deplete temporary storage, and violate service level agreements with third party data sources. Accordingly, with unmanaged data flow, utility of such connected embedded devices may be lost.

BRIEF DESCRIPTION OF THE DRAWINGS

Reference will now be made to the accompanying drawings showing example embodiments of the present application, and in which.

DETAILED DESCRIPTION

Figure 1:
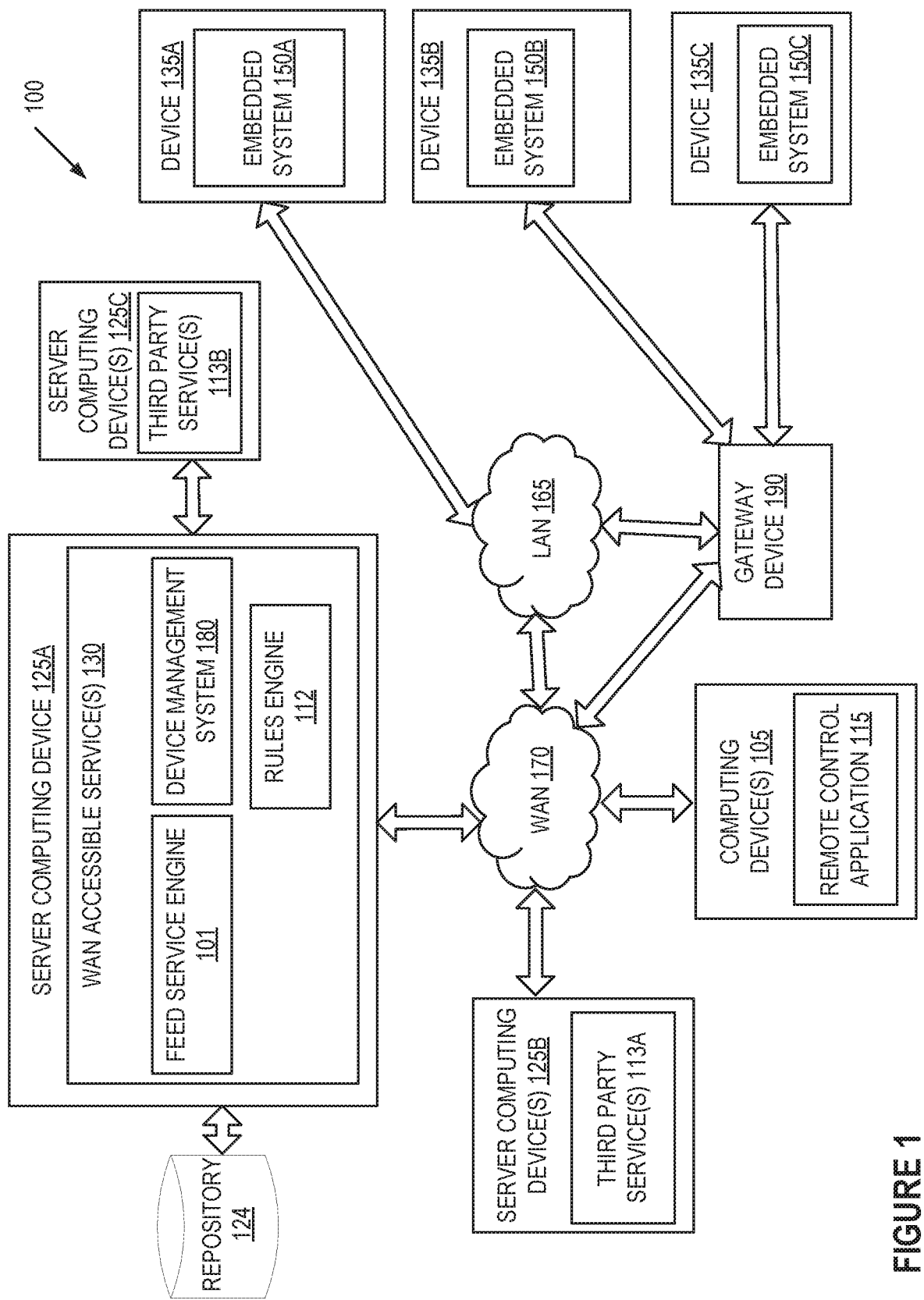
FIG. 1 is a block diagram depicting an example network architecture including remotely accessible devices and computing devices that interact with the remotely accessible devices.

Embodiments are directed to a network-connected device platform (also referred to as an Internet-of-things (IoT) cloud platform or simply an IoT platform) that provides a data feed services that connect to third party data feeds and provide data from the third party data feeds to devices.

A data feed refers to a mechanism for delivering data streams from a server (data source) to a client automatically or on demand. A data feed service is a service that delivers data from external data feeds to devices. Accordingly, a data feed service may be a data feed client that receives a data stream from a third party service, and may additionally be a data feed server that provides the data stream to one or more devices. A data feed can be provided by any data source such as a third party server, a device having an embedded system (e.g., an outdoor thermostat, web service, API, etc.), etc. A data feed may be a public data feed or a private data feed. Some examples of data that may be provided by a data feed include small snippets of information or news (e.g., weather alerts, news headlines, etc.), information to run or control an application or device, advertisements, marketing data, and so on.

A data feed may have an established format for data included in a data stream. The data may be provided as files and/or information arranged in tables. Some example file types that may be used for data include comma-separated value (CSV) files, extensible markup language (XML) files, plain text files, and so on. Some examples of data feed formats include Rich Site Summary (RSS), Atom®, resource description framework (RDF), web ontology language (OWL), and simple comma-separated values (CSVs). As an example, an RSS data feed may provide RSS documents, which may include full or summarized text, and metadata, like publishing date and author's name.

Simple data feeds may supply standard information in response to a generic request. Data sources of data feeds typically offer customizable or configurable options to select the data provided in the data feed from the data source. The data source may supply more than one type of information, enable multiple formats or protocols, offer delivery options, etc. For example, to configure a data feed, a request may include parameters, such as a topic, a location, a language, etc. Data feeds may use static or dynamic information to provide updated data to a requestor (a client of the data feed). For example, a request for a data stream of weather updates may include a login, token, and/or dynamic location information for a location.

A private data feed can be a data feed to share data with approved devices and may require authentication (e.g., a token, login information, credentials, etc.), and/or in some cases provide information in a proprietary or encrypted format. Private data feeds may also be established for remote components of a device to communicate updates (e.g., a sensor reading, remote control, etc.). For example, a data source may have a paywall that requests account login information.

A data feed service may manage and schedule the receipt of data streams from data feeds of many different data sources and may additionally manage and schedule data feeds that provide data streams to many different devices in an efficient scalable manner. The data feed service efficiently gathers data from various data sources that may have public and/or private feeds. The data may then be delivered to devices according to scheduled delivery intervals or time periods. For example, the data feed service may schedule the collection of data from a set of distributed devices such as temperature sensors in various locations and the delivery of the data to one or more other devices that may act upon temperature readings from the temperature sensors. By scheduling data collection and/or data delivery at various (e.g., scheduled, repeated, periodic, etc.) intervals, the data feed service can provide improved network performance and bandwidth management.

Managing data updates from data feeds of multiple data sources by the data feed service can increase capabilities of end-point devices as well as conserve bandwidth of networking and processing resources. The data feed service may coordinate and inventory data feed entries, develop schedules to queue data feed jobs at pre-defined intervals, transform the data feed jobs with static and dynamic parameters into data requests, batch data requests among a common data source, receive data from data feeds, place the data into a cache, and deliver the data to one or more endpoint devices.

Referring now to the figures, FIG. 1 is a block diagram depicting an example network architecture 100 including remotely accessible devices 135A-C and computing devices 105, 125A, 125B, 125C that may interact with the remotely accessible devices 135A-C. The network architecture 100 includes the multiple devices 135A-C connected to a local area network (LAN) 165. Thus, the devices 135A-C may be referred to as network-connected devices, remote target devices or endpoint devices. Some of the devices 135B-C lack connectivity to an Internet protocol (IP) network, and thus connect to the LAN 165 and computing devices 105, 125A, 125B via a gateway device 190.

In an embodiment, the devices 135A-C are devices with embedded systems 150A-C, and may include, for example, electrical appliances such as refrigerators, ovens, washers, driers, dishwashers, thermostats, alarms, air conditioners, televisions, radios, receivers, amplifiers, and so forth. The devices 135A-C may also include consumer devices such as digital watches, music players, game consoles, digital cameras, printers, and so forth. Other examples of devices 135A-C include stationary devices such as heating, ventilating, and air conditioning (HVAC) systems, traffic lights, factory controllers, signs, electronic billboards, sprinkler systems, and irrigation control systems, as well as medical devices. Devices 135A-C may also be any other type of device that includes an embedded system. Alternatively, one or more devices 135A-C may not include an embedded system.

An embedded system 150A-C is a class of computing device that is embedded into another device as one component of the device. The device 135A-C typically also includes other hardware, electrical and/or mechanical components that may interface with the embedded system 150A-C. Embedded systems 150A-C are typically configured to handle a particular task or set of tasks, for which the embedded systems 150A-C may be optimized. Some devices have fewer components that limit functionality of the emended system. Accordingly, the embedded systems 150A-C may have a minimal cost and size as compared to general computing devices.

The embedded systems 150A-C may each include a communication module (not shown) that enables the embedded system 150A-C (and thus the device 135A-C) to connect to LAN 165, to gateway device 190, or to a wireless carrier network (e.g., that is implemented using various data processing equipment, communication towers, etc.). The communication module may be configured to manage security, manage sessions, manage access control, manage communications with external devices, manage internal modules, manage an internal timer, and so forth. In an embodiment, the communication module can be used to receive a data, such as a data feed from a server computing device 125B-C.

In one embodiment, the communication module of embedded system 150A is configured to communicate using Wi-Fi® or Ethernet (e.g., 10 Megabyte (Mb), 100 Mb and/or 1 Gigabyte (Gb) Ethernet). Communication modules may also be configured to communicate with a wireless carrier network using Global Systems for Mobile Communications (GSM), Code-Division Multiple Access (CDMA), Universal Mobile Telecommunications Systems (UMTS), 3GPP Long Term Evaluation (LTE), Worldwide Interoperability for Microwave Access (WiMAX), or any other second generation wireless telephone technology (2G), third generation wireless telephone technology (3G), fourth generation wireless telephone technology (4G) or other wireless telephone technology.

The LAN 165 includes a router, switch, bridge or other network device (not shown) that enables communication between multiple devices connected to the LAN 165. The network device may provide wired connections to the LAN using, for example, Ethernet ports, universal serial bus (USB) ports and/or Firewire® ports. The network device may additionally provide wireless connections to the LAN using, for example, a Wi-Fi transceiver.

Some communication modules of embedded systems 150B-C may be configured to communicate using Bluetooth®, ZigBee®, power line communication (PLC), or other communication protocols. For example, devices 135B-C may support ZigBee or Bluetooth. ZigBee is a collection of wireless mesh network protocols. Bluetooth is a frequency-hopping spread spectrum (FHSS) wireless communication protocol that uses short-wavelength ultra-high frequency (UHF) radio waves in the industrial, scientific and medical (ISM) radio band from 2.4 to 2.485 GHz. To enable such devices to connect to the LAN 165, the LAN 165 may include gateway device 190 connected to the network device via one of the connection types supported by the network device (e.g., via Ethernet or Wi-Fi). Alternatively, the network device of the LAN 165 and the gateway device 190 may be combined into a single device.

In addition to supporting TCP/IP protocols, the gateway device 190 may additionally support other communication protocols such as ZigBee, BACnet, PLC and/or Bluetooth, and may translate between supported communication protocols. Accordingly, some devices (e.g., devices 135B-C) may connect to the LAN 165 and/or to the WAN 170 through the gateway device 190. In one embodiment, gateway device 190 includes one or more IP network adapters (e.g., Wi-Fi adapters, Ethernet adapters, etc.) and one or more type of non-IP network adapters (e.g., one or more network adapters for ZigBee communications (referred to as a ZigBee gateway), one or more network adapters for Bluetooth communications (referred to as a Bluetooth gateway), etc.).

The LAN 165 (or wireless carrier) is connected to a wide area network (WAN) 170. The WAN 170 may be a private WAN (e.g., an intranet) or a public WAN such as the Internet, or may include a combination of a private and public network. The LAN 165 may include a router and/or modem (e.g., a cable modem, a direct serial link (DSL) modem, a Worldwide Interoperability for Microwave Access (WiMAX®) modem, a long term evolution (LTE®) modem, etc.) that provides a connection to the WAN 170.

Computing devices 105 may include portable devices such as electronic book readers, portable digital assistants, mobile phones, smart phones, laptop computers, portable media players, tablet computers, cameras, video cameras, netbooks, notebooks, and the like. Computing devices 105 may also include traditionally stationary devices such as desktop computers, gaming consoles, digital video disc (DVD) players, media centers, and the like. Computing devices 105 may connect to the WAN 170 and/or to the LAN 165.

The WAN 170 may include or connect to one or more server computing devices 125A-C. The server computing devices 125A-C may include physical machines and/or virtual machines hosted by physical machines. The physical machines may be rackmount servers, desktop computers, or other computing devices. In one embodiment, the server computing devices 125A-C include virtual machines managed and provided by a cloud provider system. Each virtual machine offered by a cloud service provider may be hosted on a physical machine configured as part of a cloud. Such physical machines are often located in a data center. The cloud provider system and cloud may be provided as an infrastructure as a service (IaaS) layer. One example of such a cloud is Amazon's® Elastic Compute Cloud (EC2®).

Server computing devices 125B-C can include one or more third party services 113A, 113B. Third party services 113A, 113B may be services provided by entities other than a provider of an IoT platform that includes WAN accessible services 130. As shown, server computing devices 125B-C may connect to server computing device 125A directly or via WAN 170. Examples of third party services include weather services (e.g., that provide live weather feeds), time services (e.g., an atomic clock), a rich site summary (RSS, also known as really simple syndication) feed, earthquake data for an area (e.g., usable to shut off utilities in the event of a large earthquake), an original equipment manufacturer (OEM) hosted service that keeps track of customer payments (e.g., usable to turn off device controls if payment is not received), and so on. The third party services 113A, 113B may include data feeds that are accessible by feed service engine 101 of the WAN accessible services 130. Third party services 113A, 113B may additionally include third party IoT cloud services. For example, WAN accessible services 130 may interface with a Nest® thermostat cloud service for receiving information about a Nest thermostat of a user. The Nest thermostat cloud service for a specific user account may be a private data feed.

Devices 135A-C may also provide data feeds. For example, device 135A may be a sensor that provides measurement data in a data feed. Device 135A might also be, for example, an Amazon® Echo® device or other personal assistant device that provides a data feed of command data that may be based on user voice commands.

Data feeds provided by third party services 113A-B, devices 135A-C and/or other systems may be public data feeds or private data feeds. Public data feeds are data feeds that are accessible by any system. Private data feeds are data feeds that are only accessible to systems that are able to provide appropriate credentials. A third party service 113A-B may provide many different private data feeds, where each private data feed may be associated with a different user account. To access a private data feed, a user may enter their credentials (e.g., login ID and password or go through an authorization procedure to provide authorization to perform actions on the user's behalf with regards to accessing the private data feed.

Server computing device 125A hosts one or more WAN accessible services 130, which may be a web based services and/or a cloud services (e.g., a web based service hosted in a cloud computing platform). One such WAN accessible service 130 is a device management system 180. The device management system 180 may maintain sessions (e.g., via a continuous or intermittent connection) with one or more of the embedded systems 150A-C and/or with gateway device 190. Alternatively, the device management system 180 may periodically establish sessions with the embedded systems 150A-C and/or gateway device 190.

Device management system 180 may maintain up-to-date information on the devices 135A-C, and such up-to-date information may be reflected in a virtual device (not shown) maintained by the device management system 180. may change based on environmental conditions of the embedded systems and reflected in the virtual device of the device management system 180.

Device management system 180 may use one or multiple virtual devices for each of the devices135A-C on the IoT platform and communicate attributes or properties of the device. The device management system 180 can maintain a virtual representation of a device 135A-C (or a component, feature or feature set of a device) that captures the physical and behavioral attributes or properties of the device 135A-C. The terms device attributes and device properties will be used interchangeably herein. The virtual device may store and communicate the device attributes of an associated endpoint device. Status updates received from the embedded systems of endpoint devices may identify values or states of some or all detectable properties or attributes of devices 135A-C that the embedded systems are included in. By maintaining or periodically establishing sessions with the embedded systems 150A-C, the device management system 180 may maintain up-to-date information on the devices 135A-C, and such up-to-date information may be reflected in a virtual device.

A property (also referred to as an attribute) of a device may be represented as a name-value pair (also referred to as a key-value pair). The name/key represents a property, and the value represents a status of the property. One type of device property for a device is a data feed property (also referred to as a feed property). The value for a data feed property may be data that a data feed service receives from a data feed and forwards to the device. Status updates may also include fault information, statistical device usage information, trace data and/or other information. Such values, states and/or other information may change based on direct user interaction with the devices. Such values, states and/or other information may also change responsive to commands sent to the embedded systems 150A-C by the device management system 180 and/or by computing devices 105A-C via an appropriate virtual device. Moreover, values, states and other information of the embedded systems 150A-C may change based on environmental conditions of the embedded systems. By maintaining or periodically establishing sessions with the embedded systems 150A-C, the device management system 180 may maintain up-to-date information on the devices 135A-C, and such up-to-date information may be reflected in a virtual device.

In one embodiment, WAN accessible services 130 include feed service engine 101. The feed service engine 101 is a service that delivers external data feeds to devices. Feed service engine 101 is responsible for connecting to one or more external data feeds provided by data sources and delivering data streams from the external data feeds to devices 135A-B. The data sources may be devices 135A-C, computing device 105, third party services 162, and so on.

Feed service engine 101 may receive instructions to generate a new data feed entry. Feed service engine 101 may then generate a data feed entry and store it in repository 124. The repository 124 may be a data store such as a file system, a database, and so on. The repository 124 may include persistent storage such as solid state drives, disk drives, etc. The data feed entry is an object, file, data structure, table entry, database record, or other data arrangement that contains all of the information to be used to retrieve data from a data feed of a data source and provide that data to a device.

Data feed entries may include a schedule indicating intervals or time periods in which a data feed job is to be scheduled for delivery of data to a device 135A-B. The data feed entry may be created by specifying parameters for the data feed of the data source (e.g., source address, information from an introduction message, protocols, data type, data feed options provided by the data source, etc.), device information for a device to which data will be sent (e.g., device identifier, device properties, etc.), an update frequency (e.g., a schedule for data delivery), and/or other information. A data feed entry may additionally include instructions to gather current information (e.g., of a device) prior to sending a data request to a data source. For example, loading a data feed job may include gathering current information for a device 135A-C from the device service 180 such as the current location of a device or a sensor reading of the device. Feed service engine 101 may also receive instructions to schedule an existing data feed job for delivery of data from a data source to a device 135A-C based on a previously stored data feed entry.

Instructions to create a data feed entry or to schedule a data feed job from an existing data feed entry may be received from a remote control application 115 via a provided API or from a web interface. The instructions may also be received from rules engine 112, from a third party service 113A-B, and/or from another WAN accessible service 130 (e.g., from device management system 180). In some examples, a device 135A-C that sends the instruction to create a data feed entry to the feed service engine 101 also receives a data stream from a data feed associated with the data feed entry via the feed service engine 101.

The feed service engine 101 establishes connections to data feeds from data sources based on data feed jobs initiated from data feed entries. Feed service engine 101 may then receive data streams from the data feeds, and may cache data from the data streams in a cache. Subsequent data feed jobs may check the cache for data from data sources prior to querying those data sources for the data. If the data is in the cache, then the data from the cache may be sent to subscribed devices 135A-C.

By managing frequently updated information from data feeds of multiple sources for multiple devices, the feed service engine 101 provides a highly scalable solution to manage communication for a network-connected device platform. Managing updates to data from multiple data sources for a plethora of devices by the data feed service 101 can increase communication capabilities of devices as well as conserve bandwidth resources. The data feed service engine 101 is capable of coordinating data feed jobs, developing schedules to queue the data feed jobs at pre-defined intervals, batching data feed jobs among a common data source, receiving and caching data from data sources, and delivering the data to devices 135A-C.

In an example, a data feed entry for weather data may indicate a data feed of a weather data source (e.g., an RSS feed from Weather Underground or National Oceanic and Atmospheric Administration (NOAA)), a device, a location of the device to provide to the weather data source, a data type indicating temperature, and a schedule (e.g., to deliver temperature information to the device every 30 minutes). Feed service engine 101 may schedule a data feed job for retrieving temperature data for the location from the data feed and sending the temperature data to the device every 30 minutes based on the data feed entry. At each 30 minute interval, feed service engine 101 can retrieve updated temperature information for the location from the data feed and send the updated temperature information to the device 135A-C.

WAN accessible services 130 can include a rules engine 112. Rules engine 112 applies one or more rules to determine actions and generate messages and/or commands to implement the determined actions based on received events. The rules engine 112 may at any time receive notifications of events from any of devices 135A-C, third party services 113 or other WAN accessible services 130.

In one embodiment, the rules engine 112 includes multiple input feeds, where each input feed is associated with a data feed (e.g., of a third party service113A, 113B, a device 135A-C, etc.). Each of these input feeds may be sources of data that may satisfy conditions specified in rules. The rules engine 112 may then determine whether the data received from a data source satisfies criteria that trigger one or more events or operations indicated in a rule. Responsive to determining that received data satisfies criteria of a rule, rules engine 112 may generate an instruction for the feed service engine 101 to schedule a data feed job for delivering a data update from a data feed to a device 135A-C and/or may perform other actions. Rules engine 112 may additionally or alternatively generate an instruction for the feed service engine 101 to send data to a WAN accessible service 130 or third party service 113A-B. Additionally, rules may cause feed service engine 101 to enable or disable schedules for specific data feed entries when criteria of the rules are satisfied.

Computing devices 105 may include a remote control application (or multiple remote control applications) 115 that can receive information for devices 135A-C, control devices 135A-C, generate data feed entries for delivering data to devices 135A-C, and so on. The remote control application 115 may be programmed to run on various operating systems, such as Windows® operating systems, Unix® operating systems, iOS® operating systems, Android® operating systems and Java® operating systems to name a few. The remote control application 115 may also be configured as firmware, or as hardware, or as some combination of software, firmware and/or hardware. The remote control application 115 may include a graphical user interface (GUI) that enables users to interact with the feed service engine 101 to generate and/or modify data feed entries in an intuitive and user-friendly manner. A user may interact with the GUI to cause the remote control application 115 to generate a data feed entry. In one embodiment, the remote control application 115 accesses a data feed creator API provided by the feed service engine 101 to establish and/or edit data feed entries.

Figure 2:
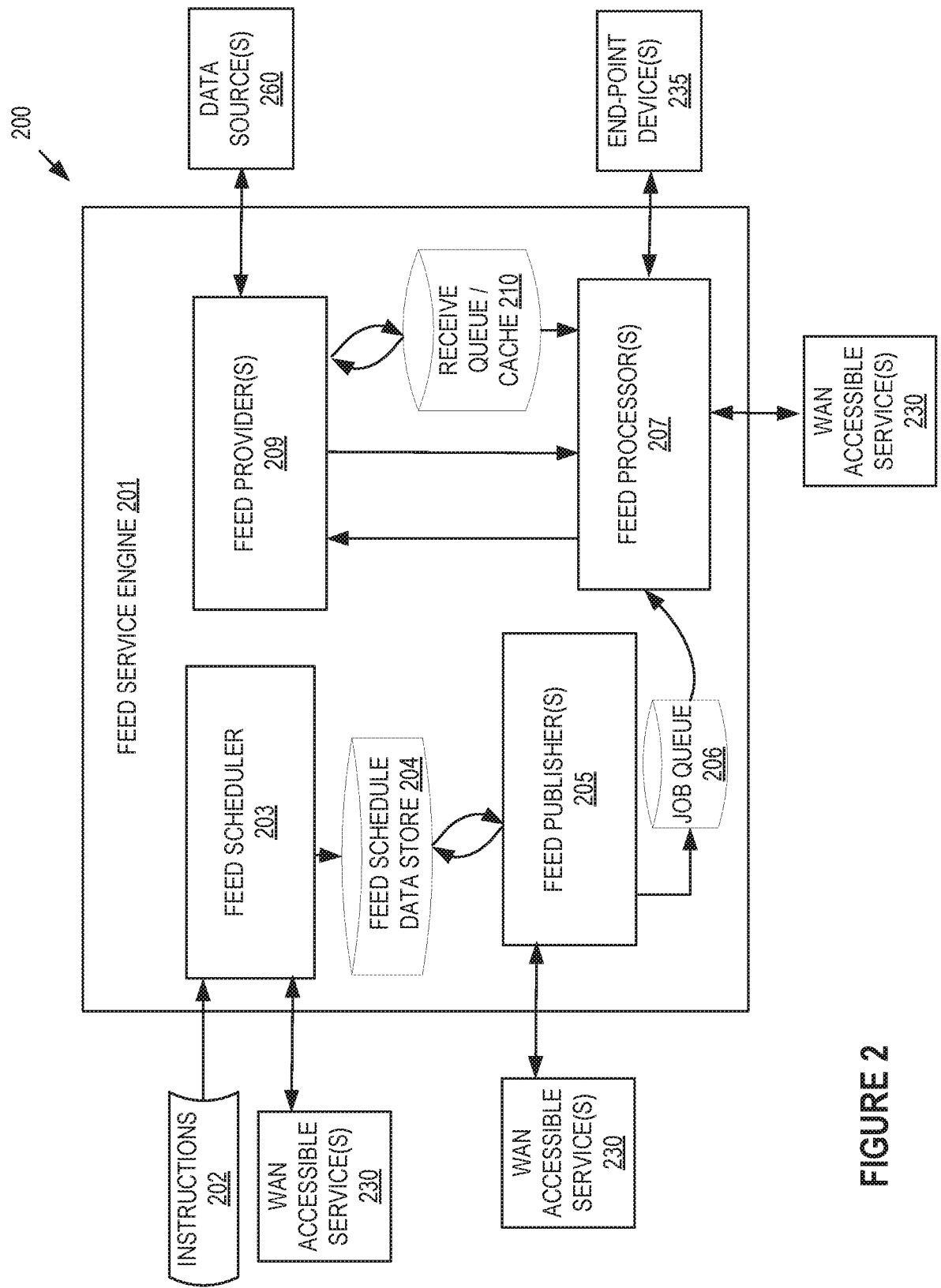
FIG. 2 is a block diagram of an example feed service engine in accordance with one embodiment of the present disclosure.

FIG. 2 is a block diagram 200 depicting interactions of a feed service engine 201, in accordance with one embodiment of the present disclosure. In one embodiment, feed service engine 201 corresponds to feed service engine 101 of FIG. 1. The feed service engine 201 generates data feed entries and schedules data feed jobs from the data feed entries. When data feed jobs are executed, feed service engine 201 delivers feed data from data feeds to end-point devices 235. The feed service engine 201 may be a WAN accessible service executing on a server computing device (e.g., server computing device 125A of FIG. 1). The end-point devices 235 can include one of the aforementioned types of devices having an embedded system, and can correspond to a device 135A-C of FIG. 1.

The data feeds can be public or private feeds from data sources 260 (e.g., a WAN accessible service 130, a remote control application 115, and/or third party service 113 of FIG. 1). The feed service engine 201 can leverage the public and private data feeds to deliver data to devices 235. The feed service engine 201 provides scheduling and scalability for requesting and delivering feed data to the end-point devices 235.

In one embodiment, the feed service engine 201 includes a feed scheduler 203, a feed publisher 205, a feed processor 207, and/or a feed provider 209. The feed scheduler 203 manages data feed entries (e.g., feed schedules). The feed publisher 205 is responsible for generating and publishing data feed jobs based on data feed entries. The feed publisher 205 queries the feed schedule data store 204 to identify data feed jobs that are scheduled to be processed and loads the jobs into a job queue 206. The feed processor 207 is responsible for processing feed jobs from the job queue 206 and sending data to endpoint devices 235. The feed provider 209 implements retrieval and caching of third party data responsive to commands from feed processor 207. The feed provider 209 interfaces with one or more data sources 260 to obtain data from data feeds provided by the data sources 260. The feed scheduler 203, feed publisher 205, feed provider 209 and feed processor 207 are described in more detail below.

The feed scheduler 203 is responsible for creating data feed entries, storing the data feed entries in a feed schedule data store 204, and maintaining the data feed entries in the data feed schedule data store 204 (also referred to as a repository). The feed scheduler 203 can be an API of the feed service engine 201. The scheduler 203 can establish a schedule to automatically create data feed jobs. In one embodiment, the feed service engine 201 decouples data requests from the devices that receive requested data. By storing data feed entries in a feed schedule data store 204 with available information and instructions, the feed scheduler 203 centrally manages data feed requests to multiple data sources and data streams to multiple devices.

A requesting entity such as a WAN accessible service 230 (e.g., a rules engine 112, a device management service 180, etc.), a remote control application 115, a web interface, a third party service, etc., can send instructions 202 for generating a new data feed entry or editing an existing data feed entry. Feed scheduler 203 may then generate a data feed entry and store it in feed schedule data store 204 or modify an existing data feed entry in the feed schedule data store 204. The feed schedule data store 204 may be a persistent storage. For example, the feed schedule data store 204 may be a file system or database on one or more SSDs, disk drives, or other persistent storage media.

Each data feed entry may be a feed schedule that encapsulates the information for a data feed including a data source 260 from which to receive data, an endpoint device 235 to send received data to, a schedule of when to send the received data to the endpoint device 235, and/or other information. A data feed entry may include, for example, a data feed description, a feed identifier (e.g., a uniform resource locator (URL) or uniform resource identifier (URI) for a data feed of a third party service), a data source 260 identifier, an endpoint device 235 identifier, a property feed type, a property feed subtype, a feed event, feed parameters, feed job metadata, and so on.

A property feed type can identify what type of data is to be supplied by a data source. Examples of property feed types include current weather, forecast weather, current time, current temperature, current stock quotes, and so on. A property feed subtype indicates a subtype of a property feed type, where the subtype may be a data format such as a units of measurement. The property feed subtype may be, for example, a units of measurement for the property feed type. For example, the property feed subtype may be temperature in Celsius, temperature in Fahrenheit, relative humidity, distance in miles, distance in kilometers, and so on. Feed job metadata is data intended to facilitate the full horizontal scalability of the feed service engine 201. Feed job metadata may include, for example, database entries representing currently deployed feed processors 207, feed publishers 206 and feed providers 209 with their corresponding state. Feed job metadata may additionally include rules specifying what conditions will trigger resizing of clusters of feed processors 207, feed publishers 206 and feed providers 209 as well as subsequent job rebalancing between them within each cluster.

A feed event represents the schedule of when a data feed job should be created for a data feed entry to provide data from a data feed to a device. The feed event may be a schedule that indicates a frequency or an interval for sending updated feed data from a data source 260 to a device 235. Schedules for data feed jobs can be represented by interval point pairs including an interval length and a point during the interval to trigger the data feed job (point). A data feed event can be represented as a pair of two non-negative integers (I,M), e.g. "5,0" "30,12", "60,59", etc. In one embodiment, the first number I is the feed interval in minutes (an integer bigger than 1) and the second number, M ($0<=M<I$), can be a point in the interval (e.g., a minute within the feed interval) at which the value for the feed property is delivered to the intended device. For example a value (30, 12) can represent the instruction to "feed the device that has this property every 12th minute of a 30 minute feed interval."

The feed parameters can be information to provide to the data source to process a request for data. Examples of feed parameters can include a device location (e.g., for the current weather at that location), a location and time in the future (e.g., for the weather forecast at that location and time), a language setting of the device, etc. Feed parameters may include one or more attributes or properties of a device 235 to which data will be sent. The feed scheduler 203 may interface with a device management service to determine the one or more attributes or properties of an end-point device 235 associated with a data feed entry. The attributes or properties may be static properties (e.g., a device type, data formats readable by the device, etc.) and/or may be dynamic properties (e.g., a device location, a device time zone, device settings, a device power state, etc.). Such properties may be included in the data feed entry. Alternatively, or additionally, device property variables may be included in the data feed entry, and the feed processor 207 may query the device management system for updated values periodically or when data is to be requested from a data source.

The feed scheduler 203 can create, read, update and delete data feed entries in the feed schedule data store 204. A new data feed property may be added to a device 235, where the data feed property is a logical property of the device indicating that the device receives data from a particular data feed. In one embodiment, a POST operation is performed in a same flow that creates a new feed property for a device in the device management system. The POST operation may be an operation to create a corresponding data feed entry having a data feed property that corresponds to the new data feed property added to the device 235.

In some embodiments, the feed scheduler 203 receives instructions 202 to change a stored data feed entry (e.g., change the data source 260, change the schedule, or change other information) and the feed scheduler 203 modifies the data feed entry accordingly. The feed scheduler 203 can synchronize feed schedules (e.g., as represented in the data feed entries) with the device management system. For example, a PUT operation can update the data feed entries in the feed schedule data store 204 with values from the device management system. An update of a data feed entry can for example include a change in a feed interval, which in its turn changes the feed schedule). The feed scheduler 203 can delete or modify a data feed entry associated with an endpoint device 235 based on data about the associated endpoint device. For example, the feed scheduler 203 can deactivate or unscheduled a data feed event in a data feed entry responsive to a notice that the endpoint device 235 associated with the data feed entry is turned off. A GET operation may be used for syncing of feed schedules with the device management system for the purpose of fault tolerance.

Feed scheduler 203 may also delete data feed entries. Data feed entries may be deleted as a result of an operation to delete a data feed property from a device 235. This may ensure that feed service engine 201 does not unnecessarily request data from external data feeds that is no longer requested by devices 235.

The feed publisher 205 is a component of the feed service engine 201 that generates and publishes data feed jobs from data feed entries in the feed schedule data store 204. The feed publisher 205 enqueues feed jobs into a job queue 206 for the feed processor 207 to load and execute. A feed job is an object with encapsulated information about an action for the feed processor 207 to perform to cause updated data from a data feed of a data source 260 to be sent to a device 235. A data feed job may contain much of the information from an associated data feed entry, such as a feed identifier (e.g., a uniform resource locator (URL) or uniform resource identifier (URI) for a data feed of a third party service), a data source 260 identifier, an endpoint device 235 identifier, a property feed type, a property feed subtype, a feed event, feed parameters, feed job metadata, and so on. In one embodiment, data feed jobs are to be executed immediately by feed processor 207, and so no timing or scheduling information is included in the data feed jobs.

In one embodiment the feed publisher 205 publishes data feed jobs to a job queue using a queue service such as Amazon® Simple Queue Service (SQS)®. Use of a queue service for job queue 206 enables the feed publisher 205 to be decoupled from feed processor 207.

Feed publisher 205 maintains a clock and checks feed schedule data store 204 on a periodic or continuous basis to identify data feed entries that are scheduled for data transmission in a next time period or interval. The feed publisher 205 can query the feed schedule data store 204 to identify the data feed entries for which data feed jobs are scheduled to execute in an approaching time period. In one embodiment, feed publisher 205 queries the feed schedule data store 204 every minute to determine data feed entries having schedules for data delivery within a next minute. Alternatively, other intervals may be used.

In an embodiment, a data feed entry may include event information for frequency and may not include a specified time. The data feed entry may include information regarding the interval to take action and the action to take at the point in the interval. The feed publisher 205 may determine the specified time for an interval and calculate an actual time for the point in the interval to execute the job. The feed publisher 205 maintains a clock and time-related information. In response to identifying a job with an approaching point in the interval, the feed publisher 205 may publish a data feed job to a job queue 206 to be executed by the feed processor 207 at the specified time. The timing of publishing a feed job can be prior to the specified time. For example the feed publisher 205 component is like an alarm clock that signals when a job is to be executed by the feed processor 207.

In an embodiment, the feed publisher 205 queries the feed schedule data store 204 based on a publishing cycle. In an embodiment, feed publisher runs publishing cycles (e.g., once every minute) and measures the time T in minutes passed between the current time and a reference date and time. For example, the feed publisher can include an Epoch converter that measures the time T in minutes passed between the current time and midnight of Jan. 1, 1970 UTC. By taking the modulus or remainder operation against T and the number of minutes in a particular feed interval, feed publisher calculates whether the current minute when it performs its publish operation is a proper time for issuing a data feed job for a particular data feed entry stored in the feed schedule data store 204.

In an example, the date and time Jul. 24, 2015 19:41:39 coordinated universal time (UTC) is translated into 23962781. The translation of the date and time into whole feed publisher minutes can be used to maintain intervals by the feed publisher 205. To determine which data feed entries with the I minute interval events need to generate and publish a data feed job, the feed publisher 205 can perform the modulo operation on the current publisher time T as the dividend and the interval I as the divisor:

$$T \bmod I = M$$

The value M, which is the result of the time translation operation, may then be used by feed publisher 205 for identifying the data feed entries from the feed schedule data store 204 that are ready to be processed for the calculated moment, i.e. schedules that have pairs (I,M) as their event values. For example, the feed publisher determines:

$$23962781 \bmod 5 = 1,$$

$$23962781 \bmod 30 = 11,$$

$$23962780 \bmod 60 = 41,$$

$$23962780 \bmod 120 = 101$$

In the example, the feed publisher 205 that starts a publishing cycle on Jul. 24, 2015 at 19:41:39 UTC may generate data feed jobs for all data feed entries in the feed schedule data store 204 that have the following feed events: (5, 1), (30, 11), (60,41), (120, 101), etc. Then the feed publisher 205 publishes each data feed job to a job queue 206 or directly to the feed processor 207.

In some instances one or more data feed entries may not include any scheduling information. Scheduling for the creation of data feed jobs from such unscheduled data feed entries may be based on external stimuli. For example, feed publisher 205 may receive commands from WAN accessible services 230 and/or third party services (not shown) to generate a data feed job from a data feed entry in the feed schedule data store 204. In an example, a third party scheduler such as Google Calendar may be used to schedule when to generate data feed jobs for data feed entries. When an entry in Google Calendar indicates that a data feed job is to be generated, Google Calendar may send a notice to feed publisher 205 with an identification of a particular data feed entry. Responsive to receiving the notice, feed publisher 205 may generate a data feed job associated with the identified data feed entry. In another example, a rules engine may determine that a data feed job is to be generated when particular criteria of a rule are satisfied, and may then notify feed publisher of the data feed entry for which a job is to be generated.

In another example, a user may provide a command to trigger generation of a data feed job to a personal assistant such as Amazon Echo®, Siri®, Cortana®, etc. The personal assistant may then instruct feed publisher 205 to generate a particular data feed job (e.g., based on an identified data feed entry). The personal assistant may also interface with feed scheduler 203 to generate a new data feed entry. For example, a user may ask Amazon Echo to deliver basketball scores or stock tickers to a device every morning. Amazon Echo may then provide instructions 202 to the feed scheduler 203 to set up new data feed entries for retrieving such data from external data feeds and providing the data to a device of the user.

In one embodiment, feed publisher 205 can create multiple job queues 206 to accommodate a large volume of data requests scheduled to execute in parallel. In one embodiment, feed publisher 205 creates batches of data fee jobs and posts the bathes of data feed jobs to the job queue 206. Each data feed job batch may be a message that contains multiple data feed jobs that are to be processed at the same time period or interval. For example, a data feed job batch may contain 50 data feed jobs, 25 data feed jobs, 75 data feed jobs, or other amounts of data feed jobs.

Multiple instances of the feed publisher 205 can be instantiated in parallel to run at different cycles or load multiple jobs scheduled closely together. For example, a first feed publisher 205 may publish data feed jobs at minutes 1, 3, 5, etc. and a second feed publisher 205 may publish data feed jobs at minutes 2, 4, 6, etc.

The feed processor 207 is the component of the feed service engine 201 responsible for processing published data feed jobs. The feed processor 207 includes logic and resources for executing the data feed jobs from the job queue 206. Feed processor 207 retrieves one or more data feed jobs from the job queue 206 and then executes the one or more data feed jobs.

To execute a data feed job, feed processor 207 may instantiate a worker thread. The worker thread may be a component of the feed processor 207 that performs operations to retrieve data and then send the data to an endpoint device 235. In an embodiment, the feed processor 207 executes in JAVA® and the worker threads are JAVA threads. In one embodiment, a separate worker thread is spawned for each data feed job to process that data feed job. In one embodiment, a separate worker thread is spawned for each data feed job batch. The worker thread spawned for a data feed job batch may then sequentially process each of the data feed jobs in a data feed job batch.

To process a data feed job, a worker thread may query a cache 210 and/or a feed provider 209 for updated data associated with a particular data feed provided by a data source 260. To generate the query, the worker thread may determine feed parameters such as static parameters (e.g., a device identifier) and any dynamic parameters (e.g., a current location, a sensor reading, etc.). Static parameters and/or dynamic parameters may have been stored with the data feed job. Alternatively, or additionally, the feed processor 207 may query the device management system for the static parameters and/or dynamic parameters. In an embodiment, the feed processor 207 can validate the parameters and verify the parameters. For example, the feed processor 207 can check that the parameters are formatted, non-null, satisfy a condition, etc.

The worker thread may first query the cache 210 for recent data in the cache 210 associated with a specific data feed of a specific data source 260 and/or associated with one or more particular feed parameters. If such data is found in the cache and the data has not expired, the worker thread may retrieve the data and then send the data to an endpoint device 235 indicated in the data feed job. If data associated with a specific data feed of a specific data source 260 and/or associated with one or more particular feed parameters is not included in the cache 210 or is in the cache 210 but has expired, the worker thread queries feed provider 209 for the data. In one embodiment, the worker thread queries a feed provider 209, and the feed provider queries the cache 210.

The feed processor 207 can gather values for attributes or parameters in a data feed job and translate the attributes or values from a first format in which they are stored into a second format that is used by a particular data source 260 that is to be queried. For example, the feed processor 207 can gather location data or sensor information of the endpoint device 235. The feed processor 207 can translate the values for the attributes based on a translation table that identifies data formats for one or more endpoint devices and data formats for data feeds of one or more data sources 260. For example, the feed processor 207 may translate location coordinates into a zip code if the data source 260 uses zip code as a feed parameter for location. In alternative embodiments, feed provider 209 may perform the operations of translating attributes or parameters into a format usable by a data source 260.

Once the worker thread has received the data from the data feed of the data source, the worker thread provides that data to an endpoint device 235 specified in the associated data feed job being processed. The data feed job may include a device ID (e.g., device serial number (DSN) identifying the device. The data feed job may additionally include a device property indicating a property of the device (e.g., a data feed property) that is to be updated with the data. Using the device ID and the device property, the worker thread may send the data to the endpoint device 235 to update the particular device property of the endpoint device 235 with the data. Thus, each worker thread can perform a task comprising operations to obtain a single datum intended for a device by using the feed type and feed subtype values stored in the feed job and then send the acquired feed datum to the device by using the device ID and device property stored in the feed job. The feed processor 207 (e.g., worker thread) can communicate with the WAN accessible services 230 (e.g., the device management service) to deliver the feed data to the end-point device 235.

In some embodiments feed processor 207 includes logic to adapt or translate the feed data from a data source 260 from a first format used by the data source into a second format understood by the end-point device 235. For example, the feed processor 207 can translate received weather data from Celsius to Fahrenheit or format numerals for display by the end-point device 235. As used herein, the term "understand" as applied to the feed data means that an embedded system of the end-point device 235 is able to interpret the meanings of the feed data such as parameter values (e.g., can associate meanings to specific feed data delivered to the and-point device 235).

Once a data feed job is processed, a feed processor 207 may delete the processed data feed job from the job queue 206. If data feed jobs are batched, then a data feed job batch may be deleted from the job queue 206 once all of the data feed jobs from the batch have been processed. Worker threads may be terminated in some instances after they have processed the data feed job or data feed jobs that were assigned to them.

In an example, the feed processor 207 can run cycles in an infinite loop. In each cycle, the feed processor may pull data feed jobs and/or data feed job batches from job queue 206, spawn threads to process data feed jobs, delete data feed jobs and/or data feed job batches from the job queue 206, and terminate worker threads. In some embodiments multiple instances of the feed processor 207 can be run to perform operations.

In some embodiments, a device 235 executes one or more commands and performs an operation in response to receiving the feed data from a feed processor 207. For example, a scheduled data feed job can request a current electricity rate every 90 minutes. A device 235 may activate a device cycle in response to receiving data indicating an electricity rate that is below a threshold. Other examples of device operation include changing a setting of a device, enabling or disabling a device or function, and so on.

Feed service engine 201 may include one or more feed providers 209. Each feed provider 209 is responsible for retrieval of data from one or more data sources 260. In one embodiment, a separate feed provider 209 is used for each data source 260. Alternatively, a feed provider 209 may communicate with multiple different data sources 260. In some embodiments, feed service engine 201 includes a different feed provider 209 for each type of data feed, for each data feed, for each type of data source 260, or for each data source 260.

The feed provider 209 includes resources to communicate with data feeds of one or more data sources 260. For example, the feed provider 209 can have a data source profile that includes any protocols, API settings, authentication data, protocols, or other options associated with a data feed of the data source 260. Alternatively, or additionally, some data such as authentication data (e.g., user credentials, account information, etc.) may be provided to the feed provider 207 by feed processor 207 in a data request.

In one embodiment, a feed provider 209 queries a data source 260 for data associated with a particular data feed of the data source 260 responsive to a command or data request from a feed processor 207. Feed providers 209 may query both public data feeds and private data feeds for data. The query may include a specified data type, data subtype, authentication information (e.g., for a private data feed), and/or other feed parameters. Data source 260 may respond by sending requested data from a data feed to the feed provider 209. In one embodiment, communications between the feed providers 209 and data sources 260 are sent using a transmission control protocol/internet protocol (TCP/IP) connection. In an embodiment, a messaging service provides asynchronous communication between a feed provider 209 and a data source 260. The feed provider 209 may then store the data in a cache 210 and/or send the data to the feed processor 207 that requested the data. Alternatively, or additionally, a feed provider 209 may be set up to periodically query data feeds of one or more data sources and populate a cache 210 with retrieved data without first receiving requests for data from field processors 207.

In some embodiments, the feed provider 209 can determine if recently received data that corresponds to a previously completed data request can be used to complete subsequent requests. The previously completed request associated with the cached data may or may not be for the same device as a currently serviced request by the feed provider 209. If cached data can be used to satisfy a data request from a feed processor 207, then the feed provider 209 may retrieve that data from the cache 210 and provide the data to the feed processor 207.

The cache 210 is configurable to store recently received data for a certain period of time or age out data after a certain duration. Thus, if a first data feed job requests the external temperature for a house from an Internet weather source and then several other devices schedule requests for the same information within a threshold time period, the feed provider 209 can send the temperature to the data feed job for the first device and store the temperature in the cache. Subsequent feed providers 201 may then retrieve the temperature value from the cache and send the temperature value to data feed jobs associated with other devices. The value stored in the cache 210 can be expired, deleted and/or released after a certain duration, and the feed provider 209 can retrieve a new value from the data source 260 the next time a request is processed. In an example, the temperature may become outdated or stale after three minutes and the feed provider 209 can return to the Internet weather source to process the next request for the house's external temperature.

In some embodiments, the feed provider 209 transmits data requests to a data source 260 according to service level agreement (SLA) between feed service engine 201 and the data source 260. The SLA may specify a maximum number of data requests that the data source will accept from the field providers 209 in certain time periods. If a data request to a data source 260 within a first time period would violate an SLA, then the feed provider 209 may wait until a future time period at which the SLA would not be violated. This may cause the delivery of data to an endpoint device 235 to be delayed. In an example, a data source 260 may restrict a single requesting source (e.g., feed service engine 201) to 10 calls per minute. If 10 data requests have already been sent to the data source 260 in the last minute, then feed provider may wait until the next minute to send out a data request.

In some embodiments, a feed provider 209 can batch multiple data requests to a data source 260. For example, if multiple different data requests are to be sent to a data source 260 in a time interval, feed provider 209 may generate a single message that includes the multiple different data requests (e.g., that includes requests for multiple different values). This may reduce a number of messages sent to the data source 260 and facilitate compliance with any SLA.

In an embodiment, the feed service engine 201 can manage data flows from a real-time and/or push data feed. For a real-time or push data feed, a feed provider 209 can open a long lived connection to a data source 260. The data source 260 may then send data at any time in an unsolicited manner (e.g., without first receiving a data request from the feed provider 209). Unsolicited data may be added to a receive queue 210. A worker thread of a feed processor 207 may periodically query the receive queue 210 or may receive a notice when data is added to the receive queue 210. Responsive to identifying data in the receive queue 210, the worker thread may send the data to an endpoint device 235. Alternatively, received data may be sent by feed provider 209 to a worker thread of a feed processor 207 that has been set up to wait for data from the data source 260 and send such data to a particular endpoint device 235. The worker thread may then forward the data to the endpoint device 235. In one embodiment, the received data can be processed and delivered to the device as the data is received. In an embodiment, received data from the real-time or push data feed can be stored in a cache and delivered in response to a scheduled job, delivery rule, sampling script, remote command, etc.

In some embodiments, the endpoint device 135A-C can request updates on demand via the feed service engine 129. The on-demand data flow can include querying the database for a data feed entry corresponding to the command, scheduling a data feed job for the next available interval and processing the job as described above. The updated data can then be delivered to the requesting device. In some embodiments, the feed service engine 129 can translate or transform the received data into a format specified by the device or indicated by the device management system (also referred to as a device service).

Figure 3A:
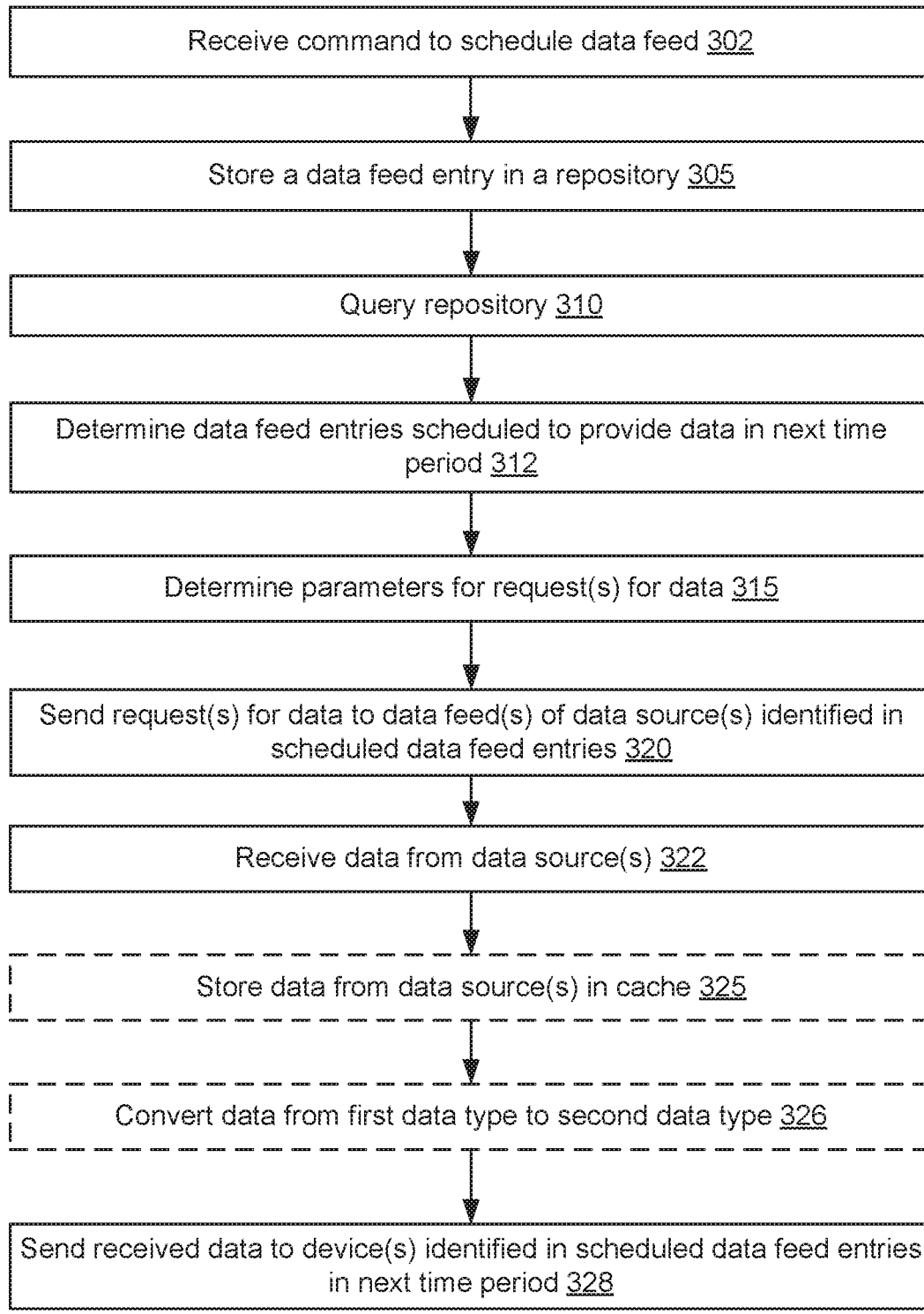
FIG. 3A is a flow diagram of a method for providing a scheduled data feed to devices in accordance with one embodiment of the present disclosure.
Figure 3B:
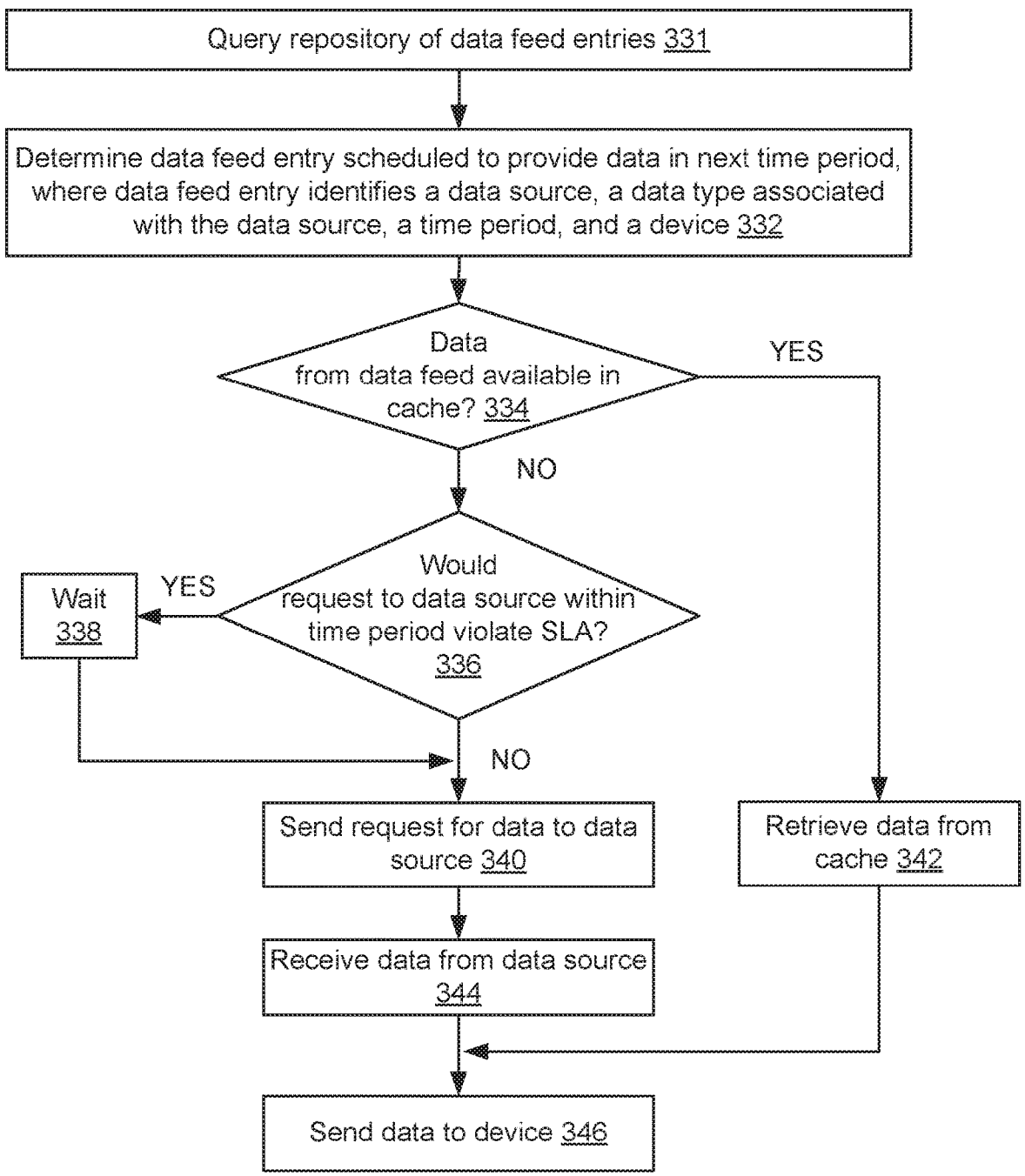
FIG. 3B is a flow diagram of another method for providing a scheduled data feed to devices in accordance with one embodiment of the present disclosure.
Figure 3C:
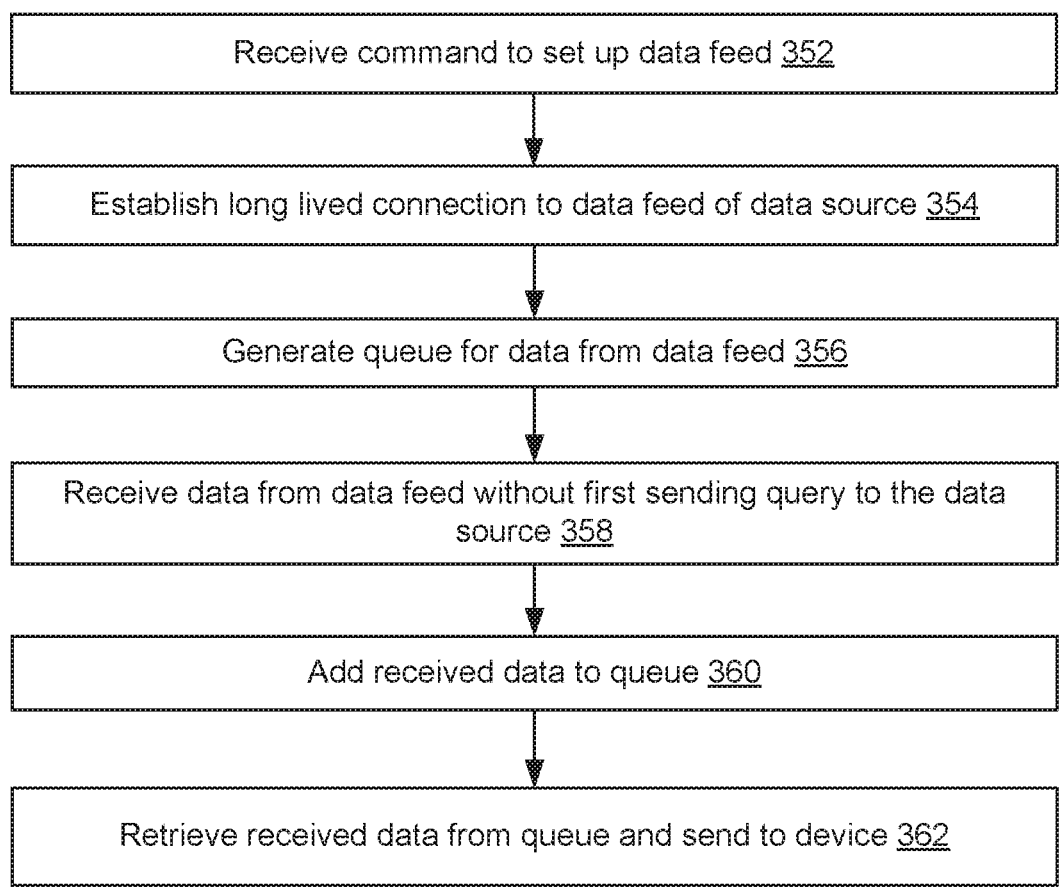
FIG. 3C is a flow diagram of a method for providing an unscheduled data feed to devices in accordance with one embodiment of the present disclosure.

FIGS. 3A-3C are flow diagrams showing embodiments of implementing a data feed service. The methods may be performed by a processing logic that may comprise hardware (e.g., circuitry, dedicated logic, programmable logic, microcode, etc.), software (e.g., instructions run on a processing device to perform hardware simulation), hardware, or a combination thereof. Various embodiments may be performed by a server computing device (e.g., server computing device 125A of FIG. 1) hosting a feed service engine (e.g., feed service engine 101 of FIG. 1).

FIG. 3A is a flow diagram of a method 300 for providing a scheduled data feed to devices in accordance with one embodiment of the present disclosure. At block 302 of method 300, a command to schedule a data feed is received. The command may be received from a WAN accessible service of an IoT platform, from a third party service, from a personal assistant, from a remote control application, from a web interface, or from another source. The command may specify a feed type, a feed sub-type, a feed schedule, a device, a device property, a data source, and/or other information.

At block 305, processing logic generates a data feed entry having the specified information and stores the data feed entry in a repository of data feed entries. The repository may include scheduled and unscheduled data feed entries. In some cases, processing logic can determine one or more parameters for the data feed entry from the received command and/or a device management service (e.g., device management service 180 of FIG. 1). The processing logic can parse the command to identify device attributes. For example, the processing logic can communicate with WAN accessible services (e.g., the device management service 180 of FIG. 1) to identify the device attributes of a device identified in the received command. For data feeds that ask for authentication (e.g., for private data feeds), the command can include user credentials or access to user credentials. In an embodiment, the processing logic can prompt a user to go through an authorization procedure to provide authorization to perform a data request on the user's behalf.

At block 310, processing logic queries the repository. Some stored data feed entries are associated with a schedule for generating data feed jobs and delivering data from a data feed to a device. In an embodiment, schedules of data feed entries can be represented by interval point pairs including an interval length and a point during the interval to trigger the data request (point). The processing logic can query the repository according to a publishing cycle (e.g., once every minute).

At block 312, processing logic determines one or more data feed entries that are scheduled to provide data in a next time period based on the query at block 310. In an embodiment, the processing logic measures a time T in minutes passed between the current time and a reference point date and time. For example, the processing logic can include an Epoch converter that measures the time T in minutes passed between the current time and midnight of Jan. 1, 1970 UTC.

By taking the modulus or remainder operation against T and the number of minutes in a particular feed interval, the processing logic may calculate whether the current minute when it performs a publish operation is a proper time for publishing a feed job for a particular data feed entry into a job queue.

The feed interval for scheduling a time to retrieve feed data from a data feed can indicate a frequency to update the feed data. For example, a feed interval can be equal to 30 minutes and the processing logic can schedule a feed event to trigger updated feed data every 30 minutes. The feed event can be a derivation from the feed interval. The feed event can be assigned at the time the job is created and stored in the repository. For example, a value (30, 12) can represent the instruction to "feed the device that has this property every 12th minute of a 30 minute feed interval."

At block 315, processing logic determines parameters for each request for data (e.g., feed parameters) that will be made to a data feed in the next time period. The processing logic may retrieve values for any dynamic parameters (e.g., a current location, a sensor reading, etc.) from a device management service or directly from a device to which data will be sent for a data feed. Each time the processing device executes the data request, current values for the dynamic parameters can be added to the request in order to customize the data request. The processing logic can transform the format of any parameters to conform to standards set by the data source to which a data request will be sent.

Some feed parameters may be credentials or authentication data for access to a private data feed. A private data feed can be a data feed to share data with approved devices and may require authentication (e.g., a token, login information, etc.), and/or in some cases provide information in a proprietary or encrypted format. Private data feeds may also be established for remote components of a device to communicate updates (e.g., a sensor reading, remote control, etc.). For example, a data source may have a paywall that requests account login information.

At block 320, processing logic sends the requests for data to each of the data sources identified in the scheduled data feed entries using the determined parameters. At block 322, processing logic receives the data from the various data feeds. At block 325, processing logic may store the received data in a cache. At block 326, processing logic may convert a data format of the data from a first format in which it was received to a second format understandable to an endpoint device. At block 328, processing logic sends the received data to the devices identified in the scheduled data feeds. The data is sent within the next time period indicated in the data feed entries.

FIG. 3B is a flow diagram of another method 330 for providing a scheduled data feed to devices in accordance with one embodiment of the present disclosure. At block 331 of method 330, processing logic queries a repository of data feed entries. Based on the query, at block 332 processing logic determines a data feed entry that is scheduled to provide data in a next time period. The scheduled data feed entry identifies a data source that provides the data feed, a data type associated with the data source, a device to which data is to be sent, and a time period within which the data is to be sent.

At block 334, processing logic determines whether data from the data feed is available in a cache. In order to manage communication resources and avoid violating service level agreements with the data source, the processing logic checks if recently received data from the data feed was previously retrieved that can satisfy a subsequent data request. In an embodiment, the processing logic temporarily stores received data from the data feed in a cache. The processing logic can determine if recently received data that corresponds to a previously completed request associated with a different data feed entry can be used to complete subsequent data feed jobs. The cached data may be marked with a timestamp and replaced with new data from the data source after a timeout period. If data from the data source is available in the cache (and has not expired), the method continues to block 342 and processing logic retrieves the data from the cache. Otherwise the method continues to block 336.

At block 336, processing logic determines whether a request to the data source within the time period would violate an SLA. The data source may dictate an SLA to control the number of requests from a single requestor. The processing logic can enforce SLAs with a third party data source to avoid sending more requests than permitted by the SLA and to avoid being blocked from the data source. For example, the data source may restrict a single requesting source to 10 calls per minute. If a request to the data source in the time period would violate an SLA, the method continues to block 338 and processing logic waits until a request would no longer violate the SLA. If the request would not violate the SLA at block 336, then the method proceeds to block 340.

At block 340, processing logic sends a request for data to the data feed of the data source. At block 344, processing logic receives the requested data from the data source. At block 346, processing logic sends the data to the device indicated in the data feed entry.

FIG. 3C is a flow diagram of a method 350 for providing an unscheduled data feed (also referred to as a push data feed or live data feed) to devices in accordance with one embodiment of the present disclosure. Method 350 may be implemented for delivering data from a list or push model data feed to devices. A live feed can provide a stream of data from the data source as the data becomes available. In some embodiments, data sources with a live data feed broadcast or push the data independent of requests for data. For example, a live data feed from an email server can be established by setting up a long lived connection with account and authentication information, and the email server can push email messages without receiving data requests.

At block 350, processing logic receives a command to set up an unscheduled data feed. At block 354, processing logic establishes a long lived connection to a data source. At block 356, processing logic generates a queue for data from the data feed. At block 358, processing logic receives data from the data feed without first sending a query for data to the data source. At block 360, processing logic (e.g., a first thread or component of processing logic) adds the data to the queue. At block 362, processing logic (e.g., second thread or component of processing logic) retrieves the received data from the queue and sends the data to a device.

Figure 4:
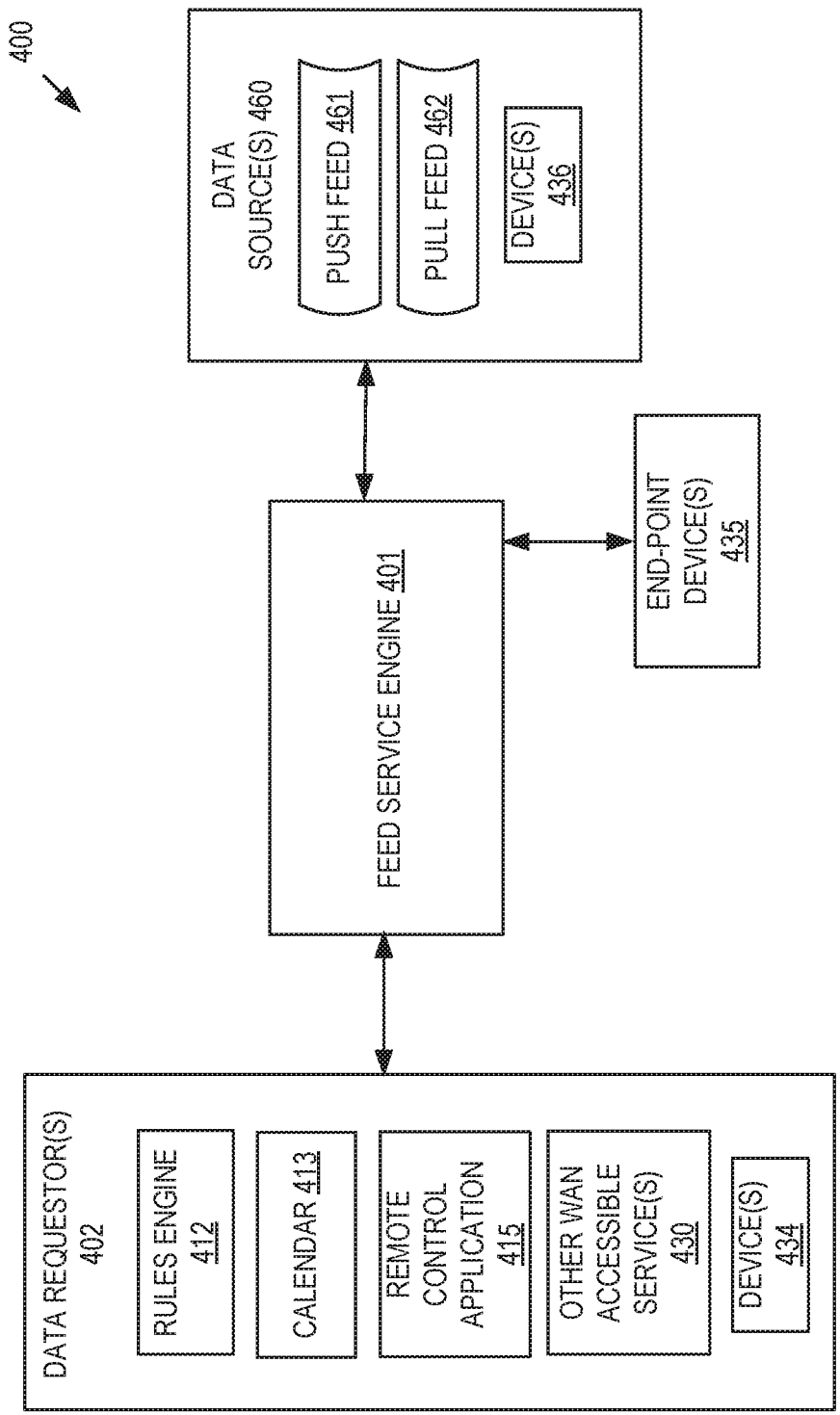
FIG. 4 is a block diagram of an example feed service engine in accordance with one embodiment of the present disclosure.

FIG. 4 is a block diagram 400 depicting interactions of a feed service engine 401 and one or more end-point devices 435 for providing data feeds from one or more data sources (e.g., a rules engine 412, an external calendar 413, a remote control application 415, a virtual device service 416, WAN accessible service 430, and/or device 435). In one embodiment, feed service engine 401 corresponds to feed service engine 101 of FIG. 1. The feed service engine 401 is a WAN accessible service executing on a server computing device (e.g., server computing device 125A of FIG. 1). The end-point devices 235 can include one of the aforementioned types of devices having an embedded system, and can correspond to a device 135A-C of FIG. 1.

As depicted in FIG. 4, the feed service engine 401 can support connections to multiple data requestors 402 and end-point devices 435. The feed service engine 401 manages data feeds for IoT devices according to embodiments that can involve enhanced data processing and delivery. In some embodiments, the feed service engine 401 schedules delivery of updated data to multiple end-point devices 435 simultaneously or in parallel.

Data requestors 402 send instructions to the feed service engine 401 to deliver data from data feeds of data sources 460 to end-point devices 435. Some embodiments provide new functionality to devices that previously were unable to access data from data sources 460 due to connection and/or formatting issues. By facilitating communication with data sources 460 and transforming received data into consumable formats by end-point devices 435 with embedded systems, the feed service engine 401 can repurpose components or provide new dimensions of control. For example, the feed service engine 401 with instructions for a display of a coffee maker can deliver feed data to display price specials on coffee filters. An original equipment manufacturer (OEM) may use specific feeds (e.g., a push feed 461) to push product maintenance, warranty information, promotions or coupons to devices. For example, Keurig™ can push coupons in the form of RSS feeds that are displayed on the device, so that the customer can view it the next time they brew coffee.

In an embodiment, a calendar 413 application (e.g., Google™ calendar, Microsoft Outlook™, etc.) is a data requestor 402. The calendar 413 application can send an instruction to request updates from a pull data source 462. The calendar 413 can trigger scheduling of data requests and include a frequency for the data request to be scheduled. For example, an appointment on the calendar 413 can request traffic information for a location of an appointment based on a dynamic location parameter of the end-point device 435. In an embodiment, the feed service engine 401 can import appointments from the calendar 413 and schedule data requests therefrom.

Some embodiments enable the devices to leverage alternative data providers. For example, a climate control system that uses a sensor to provide temperature readings from different zones may leverage the feed service engine 401 to retrieve weather data from a data source 460 on the Internet for outside temperature readings. By coordinating local data providers (e.g., devices 436) and remote data providers (e.g., a push feed 461, or a pull feed 462), the feed service engine 401 can provide a substitute to a local sensor. For example, the feed service engine 401 can update an external temperature parameter in a device 435 via a weather data provider from the Internet rather than local sensors that can be costly or prone to interruptions in service.

In an embodiment, the feed service engine 401 is connected with a rules engine 412. The feed service engine 401 may deliver feed data to the rules engine 412 to trigger a command for the end-point device 435, and the feed service engine 401 or device service can deliver the command to the end-point device 435. The rules engine 412 may determine values to assign to parameters and/or a setting of the end-point device 435 based on logical rules of the rules engine 412, and then may send controls to implement the determined values for the parameters and/or settings to the end-point device 435.

In an example, feed data from an internal thermostat (e.g., device 436) indicating the internal temperature for a structure can be combined with feed data from an Internet weather service (e.g., pull feed 462) indicating the temperature outside of the structure to control a climate control system. For example, if internal temperature relative to the outside temperature is greater than a delta threshold, the rules engine 412 can send a request to change a setpoint of the climate control system.

In some embodiments, feed data can be used to send control commands to devices. For example, public feed data may indicate heavy traffic and trigger an alarm clock a few minutes earlier than a set time. Feed data can be delivered to a control device to control other devices. In an embodiment, control of devices based on feed data can include rules or algorithms. For example, private feed data from a thermostat may indicate the temperature is set below a normal temperature relative to the outside temperature from public feed data of an Internet weather service. If the system further determines that the thermostat has not been adjusted for a prolonged time, rules or machine-learning may control other devices in a building to adjust settings to a vacation mode. So if the private feed data from the thermostat reports the user adjusted the temperature down to 50 degrees Fahrenheit and the public feed data reports the external temperature is below 35 degrees Fahrenheit, a rule may determine the feed data indicated the building is unoccupied and therefore control lights to turn on or off at scheduled times.

The original equipment manufacturer (OEM) may use specific feeds to push product maintenance, warranty information, promotions or coupons to devices. For example, Keurig can push coupons in the form of RSS feeds that are displayed on the device, so that the customer can view it the next time they brew coffee.

In another example, the rules engine 412 can determine multiple data feeds (e.g., sensor data from a security system) that indicate a structure is unoccupied. The rules engine 412 can then trigger instructions to adjust settings of multiple end-point devices 435. The feed service engine 401 can schedule to deliver control commands to the end-point devices 435, translate the commands, deliver the commands to the end-point devices 435, and/or schedule a time to return the end-point devices 435 to their previous state. For example, an instruction to turn on or off all the lights in the structure can schedule a time to switch the lights back at a specific time or after a certain interval.

The data source 460 can come from any third party services via an API. In an embodiment, a voice recognition application or an artificial intelligence application (e.g., Apple Siri™, Microsoft Cortana™, Google Now™, Amazon Echo™, etc.) with an API can be a data requestor 402 that requests data from a data feed as well as a data source 460 that provides user data. For example, a user can instruct the artificial intelligence application (e.g., other WAN accessible service) to turn on a light and the feed service engine 401 can schedule the command to push to a controller for the light. A voice command can result in a data request for a directed interaction to occur once or establish a re-occurring schedule. The artificial intelligence application can be used to train a destination device and tune update frequencies for a particular device. For example, the user can use voice commands to identify the end-point device 435 or set of end-point devices 435 to place on a vacation schedules for a weekend. The artificial intelligence application may have a conversation with a user to gather instructions, schedule parameters, device information, etc. For example, the artificial intelligence application may at the end of a conversation to book a taxi to the airport prompt the user to set end-point device 435 on a vacation schedule.

Figure 5:
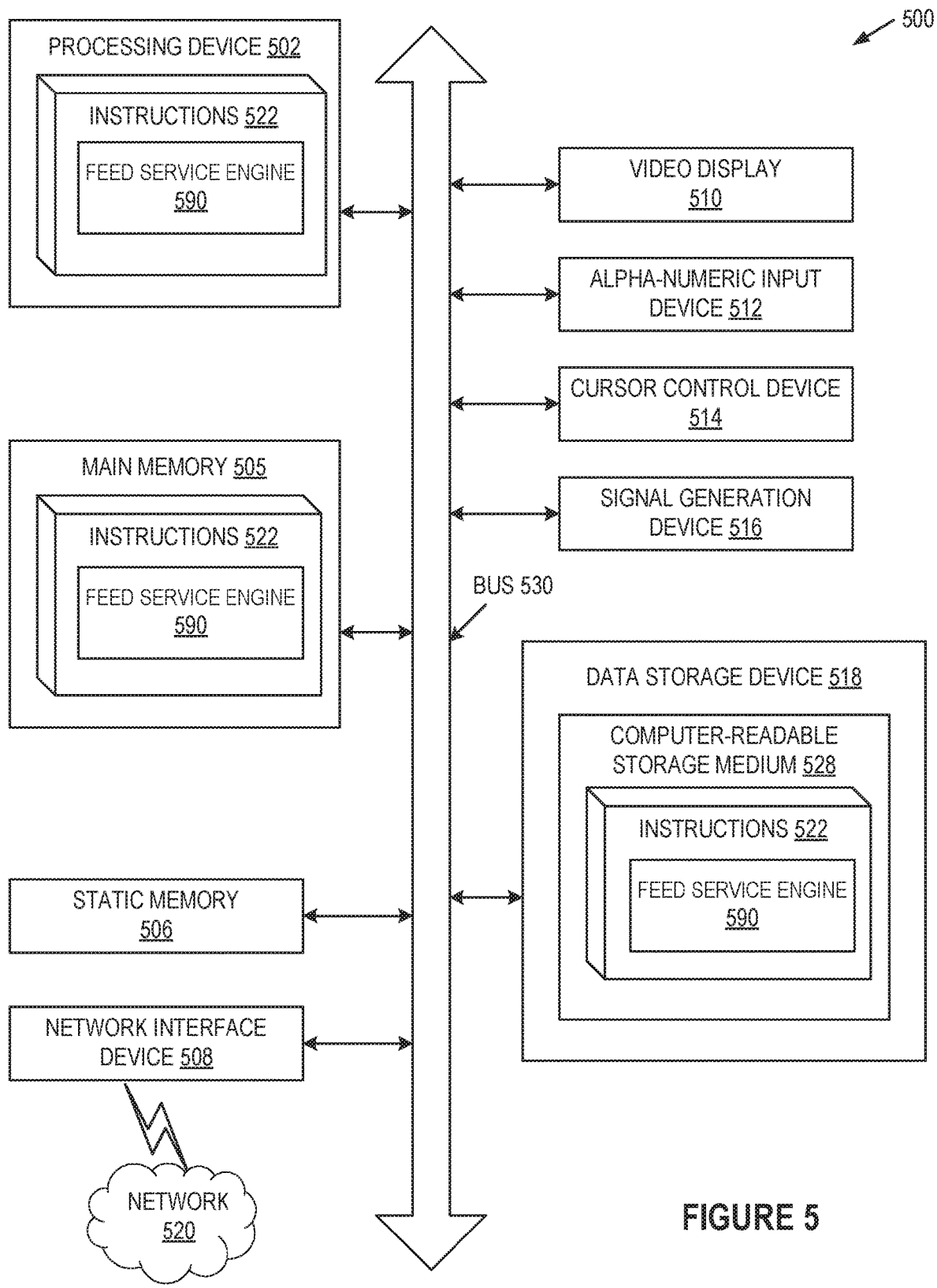
FIG. 5 illustrates a block diagram of one embodiment of a computing device.

FIG. 5 illustrates a diagrammatic representation of a machine in the example form of a computing device 500 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet computer, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The example computing device 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a secondary memory (e.g., a data storage device 518), which communicate with each other via a bus 530.

Processing device 502 represents one or more general-purpose processors such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. Processing device 502 is configured to execute the processing logic (instructions 522) for performing the operations and steps discussed herein.

The computing device 500 may further include a network interface device 508. The computing device 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a machine-readable storage medium (or more specifically a non-transitory computer-readable storage medium) 528 on which is stored one or more sets of instructions 522 embodying any one or more of the methodologies or functions described herein. The instructions 522 may also reside, completely or at least partially, within the main memory 504 and/or within the processing device 502 during execution thereof by the computer system 500, the main memory 504 and the processing device 502 also constituting computer-readable storage media.

The computer-readable storage medium 528 may also be used to store a feed service engine 590 (as described with reference to FIGS. 1-2), and/or a software library containing methods that call a feed service engine 590. While the computer-readable storage medium 528 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium other than a carrier wave that is capable of storing or encoding a set of instructions for execution by the machine and that cause the machine to perform any one or more of the methodologies described herein. The term "computer-readable storage medium" shall accordingly be taken to include, but not be limited to, solid-state memories, and optical and magnetic media.

The modules, components and other features described herein (for example feed service engine 101, 201 in relation to FIGS. 1-2) can be implemented as discrete hardware components or integrated in the functionality of hardware components such as ASICS, FPGAs, DSPs or similar devices. In addition, the modules can be implemented as firmware or functional circuitry within hardware devices. Further, the modules can be implemented in any combination of hardware devices and software components, or only in software.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "querying", "receiving", "generating", "sending", "translating", "transmitting", "performing", "instantiating", "updating", "executing", "sending", "storing", "parsing", "identifying", "determining", "scheduling", "identifying", "associating", or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present disclosure also relate to an apparatus for performing the operations herein. This apparatus may be specially constructed for the discussed purposes, or it may comprise a general purpose computer system selectively programmed by a computer program stored in the computer system. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

It is to be understood that the above description is intended to be illustrative, and not restrictive. Many other embodiments will be apparent to those of skill in the art upon reading and understanding the above description. Although the present disclosure has been described with reference to specific example embodiments, it will be recognized that the disclosure is not limited to the embodiments described, but can be practiced with modification and alteration within the spirit and scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

What is claimed is:

1. A method comprising:
    performing, by a processing device, a first query of a repository comprising a plurality of data feed entries;
    determining, by the processing device based on the first query, that a first data feed entry of the plurality of data feed entries comprises a schedule to provide data from a first data feed of a first data source to a first internet of things (IoT) device in an upcoming first time period, wherein the first data feed entry identifies the first data source, a first data type associated with the first data source, the first time period, and the first IoT device;
    generating, based on the first data feed entry, a feed job to cause the data from the first data feed of the first data source to be sent to the first IoT device in the first time period;
    determining one or more properties of the first IoT device, wherein the first IoT device comprises an embedded system to perform a device operation associated with at least one of the one or more properties;
    sending, to the first data source based on the feed job, a request for first data having the first data type, wherein the one or more properties of the first IoT device are included in the request to cause the first data source to provide the first data that is specific to the one or more properties of the first IoT device included in the request;
    receiving the first data, wherein the first data is specific to the one or more properties of the first IoT device included in the request; and
    sending the first data to the first IoT device in the first time period to cause the embedded system of the first IoT device to perform the device operation using the first data.

2. The method of claim 1, further comprising:
    caching the first data in a data store responsive to receiving the first data;
    performing a second query of the repository;
    determining, based on the second query, that a second data feed entry of the plurality of data feed entries is scheduled to provide data from the first data feed of the first data source to a second device in a second time period, wherein the second data feed entry identifies the first data source, the first data type associated with the first data source, the second time period, and the second device;

determining whether the first data has expired; and
responsive to determining that the first data has not expired, retrieving the first data from the cache and sending the first data to the second device in the second time period.

3. The method of claim 1, further comprising:
performing a second query of the repository;
determining, based on the second query, that a second data feed entry of the plurality of data feed entries is scheduled to provide data from the first data source to a second device in a second time period;
determining whether a second request to the first data source within the second time period would violate a service level agreement (SLA); and
responsive to determining that the second request to the first data source within the second time period would violate the SLA, performing the following comprising:
determining a next time period for which the second request to the first data source will not violate the SLA; and
sending the second request to the first data source during the next time period.

4. The method of claim 1, further comprising:
determining, based on the first query, that a second data feed entry of the plurality of data feed entries is scheduled to provide data from a second data feed of a second data source to a second device in the upcoming first time period, wherein the second data feed entry identifies the second data source, the first time period, and the second device;
sending, to the second data source, a request for second data;
receiving the second data; and
sending the second data to the second device in the first time period.

5. The method of claim 1, wherein the first data feed is a private data feed, the method further comprising:
determining credentials for accessing the first data feed from the first data feed entry, wherein the request for the first data comprises the credentials.

6. The method of claim 5, wherein the first data source is a second device that comprises an embedded system.

7. The method of claim 1, further comprising:
receiving second data from a second data feed of a second data source without first sending a second query to the second data source;
adding the second data to a queue associated with the second data feed;
determining that the second data has been added to the queue;
determining a second device associated with the second data feed; and
sending the second data to the second device.

8. The method of claim 1, wherein the first data has a first data format, the method further comprising:
determining a second data format associated with the first IoT device; and
converting the first data from the first data format to the second data format, wherein the first data that is sent to the first IoT device has the second data format.

9. A computer readable storage medium having instructions that, when executed by a processing device, cause the processing device to perform operations comprising:
performing, by the processing device, a first query of a repository comprising a plurality of data feed entries;
determining, by the processing device based on the first query, that a first data feed entry of the plurality of data feed entries comprises a schedule to provide data from a first data feed of a first data source to a first internet of things (IoT) device in an upcoming first time period, wherein the first data feed entry identifies the first data source, a first data type associated with the first data source, the first time period, and the first IoT device;
generating, based on the first data feed entry, a feed job to cause the data from the first data feed of the first data source to be sent to the first IoT device in the first time period;
determining one or more properties of the first IoT device, wherein the first IoT device comprises an embedded system to perform a device operation associated with at least one of the one or more properties;
sending, to the first data source based on the feed job, a request for first data having the first data type, wherein the one or more properties of the first IoT device are included in the request to cause the first data source to provide the first data that is specific to the one or more properties of the first IoT device included in the request;
receiving the first data, wherein the first data is specific to the one or more properties of the first IoT device included in the request; and
sending the first data to the first IoT device in the first time period to cause the embedded system of the first IoT device to perform the device operation using the first data.

10. The computer readable storage medium of claim 9, the operations further comprising:
caching the first data in a data store responsive to receiving the first data;
performing a second query of the repository;
determining, based on the second query, that a second data feed entry of the plurality of data feed entries is scheduled to provide data from the first data feed of the first data source to a second device in a second time period, wherein the second data feed entry identifies the first data source, the first data type associated with the first data source, the second time period, and the second device;
determining whether the first data has expired; and
responsive to determining that the first data has not expired, retrieving the first data from the cache and sending the first data to the second device in the second time period.

11. The computer readable storage medium of claim 9, the operations further comprising:
performing a second query of the repository;
determining, based on the second query, that a second data feed entry of the plurality of data feed entries is scheduled to provide data from the first data source to a second device in a second time period;
determining whether a second request to the first data source within the second time period would violate a service level agreement (SLA); and
responsive to determining that the second request to the first data source within the second time period would violate the SLA, performing the following comprising:
determining a next time period for which the second request to the first data source will not violate the SLA; and
sending the second request to the first data source during the next time period.

12. The computer readable storage medium of claim 9, the operations further comprising:

determining, based on the first query, that a second data feed entry of the plurality of data feed entries is scheduled to provide data from a second data feed of a second data source to a second device in the upcoming first time period, wherein the second data feed entry identifies the second data source, the first time period, and the second device;

sending, to the second data source, a request for second data;

receiving the second data; and sending the second data to the second device in the first time period.

13. The computer readable storage medium of claim 9, wherein the first data feed is a private data feed, the operations further comprising:

determining credentials for accessing the first data feed from the first data feed entry, wherein the request for the first data comprises the credentials.

14. The computer readable storage medium of claim 9, the operations further comprising:

receiving second data from a second data feed of a second data source without first sending a second query to the second data source;

adding the second data to a queue associated with the second data feed;

determining that the second data has been added to the queue;

determining a second device associated with the second data feed; and sending the second data to the second device.

15. The computer readable storage medium of claim 9, wherein the first data has a first format, the operations further comprising:

determining a second format associated with the first IoT device; and converting the first data from the first format to the second format, wherein the first data that is sent to the first IoT device has the second format.

16. A computing device comprising:

a memory; and a processing device operatively coupled to the memory, the processing device to:

perform a first query of a repository comprising a plurality of data feed entries;

determine, based on the first query, that a first data feed entry of the plurality of data feed entries comprises a schedule to provide data from a first data feed of a first data source to a first internet of things (IoT) device in an upcoming first time period, wherein the first data feed entry identifies the first data source, a first data type associated with the first data source, the first time period, and the first IoT device;

generate, based on the first data feed entry, a feed job to cause the data from the first data feed of the first data source to be sent to the first IoT device in the first time period;

determine one or more properties of the first IoT device, wherein the first IoT device comprises an embedded system to perform a device operation associated with at least one of the one or more properties;

send, to the first data source based on the feed job, a request for first data having the first data type, wherein the one or more properties of the first IoT device are included in the request to cause the first data source to provide the first data that is specific to the one or more properties of the first IoT device included in the request;

receive the first data, wherein the first data is specific to the one or more properties of the first IoT device included in the request; and send the first data to the first IoT device in the first time period to cause the embedded system of the first IoT device to perform the device operation using the first data.

17. The computing device of claim 16, wherein the first data feed is a private data feed, and wherein the processing device is further to:

determine credentials for accessing the first data feed from the first data feed entry, wherein the request for the first data comprises the credentials.

* * * * *